(12) United States Patent
Brugler et al.

(10) Patent No.: US 8,930,825 B2
(45) Date of Patent: Jan. 6, 2015

(54) GRAPHICALLY INDICATING RELEVANCY OF ELECTRONIC MESSAGES

(75) Inventors: Thomas S. Brugler, Raleigh, NC (US);
Vincent C. Conzola, Raleigh, NC (US);
Randall A. Craig, Raleigh, NC (US);
Todd M. Eischeid, Cary, NC (US);
Mark E. Molander, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 12/878,280

(22) Filed: Sep. 9, 2010

(65) Prior Publication Data

US 2012/0066615 A1 Mar. 15, 2012

(51) Int. Cl.
G06F 3/00 (2006.01)
H04L 12/58 (2006.01)
G06Q 10/10 (2012.01)

(52) U.S. Cl.
CPC .............. H04L 12/585 (2013.01); H04L 51/12 (2013.01); G06Q 10/107 (2013.01); H04L 12/58 (2013.01)
USPC .......................................... 715/752; 709/206

(58) Field of Classification Search
CPC ...... G06Q 10/107; H04L 51/00; H04L 51/22; H04L 51/28; G06F 3/048; G06F 3/04817
USPC .......................................... 715/752; 709/206
See application file for complete search history.

(56) References Cited

U.S. PATENT DOCUMENTS

| | | | | |
|---|---|---|---|---|
| 6,301,608 B1 * | 10/2001 | Rochkind | ..................... | 709/206 |
| 6,654,791 B1 * | 11/2003 | Bates et al. | ................... | 709/207 |
| 7,386,593 B2 * | 6/2008 | Arning et al. | ................. | 709/206 |
| 7,454,470 B1 * | 11/2008 | Isaacs et al. | .................. | 709/206 |
| 7,584,426 B2 * | 9/2009 | Chang et al. | .................. | 715/257 |
| 7,788,326 B2 * | 8/2010 | Buchheit et al. | ............. | 709/206 |
| 7,814,155 B2 * | 10/2010 | Buchheit et al. | ............. | 709/206 |
| 7,818,378 B2 * | 10/2010 | Buchheit et al. | ............. | 709/206 |
| 7,912,904 B2 * | 3/2011 | Buchheit et al. | ............. | 709/206 |
| 8,140,540 B2 * | 3/2012 | Chitiveli et al. | ............. | 707/748 |
| 8,150,924 B2 * | 4/2012 | Buchheit et al. | ............. | 709/206 |
| 8,533,274 B2 * | 9/2013 | Buchheit et al. | ............. | 709/206 |
| 2002/0111928 A1 * | 8/2002 | Haddad | ............................ | 707/1 |
| 2002/0120695 A1 * | 8/2002 | Engstrom | .................... | 709/206 |
| 2003/0195937 A1 * | 10/2003 | Kircher et al. | ................ | 709/207 |
| 2005/0204001 A1 | 9/2005 | Stein | | |
| 2005/0222890 A1 * | 10/2005 | Cheng et al. | ...................... | 705/9 |
| 2005/0222985 A1 * | 10/2005 | Buchheit et al. | ................. | 707/3 |
| 2005/0223057 A1 * | 10/2005 | Buchheit et al. | ............. | 709/203 |
| 2005/0223058 A1 * | 10/2005 | Buchheit et al. | ............. | 709/203 |

(Continued)

OTHER PUBLICATIONS

Jeffery S. Pierce, Triage and Capture: Rethinking Mobile Email, Web 2.0 Expo San Francisco 2010.

*Primary Examiner* — Shen Shiau
(74) *Attorney, Agent, or Firm* — Olive Law Group, PLLC; Thomas E. Tyson (57) ABSTRACT

Methods and systems for determining a relevancy of an electronic message, and for graphically indicating the relevancy to a user are disclosed. A method may include receiving an electronic message, such as an email, at an electronic messaging system. The method may also include determining a relevance level of the electronic message to a user based on one or both of a number of primary addressees and a number of secondary addressees identified in the electronic message. Further, the method may include displaying graphical indicia based on the relevance level.

17 Claims, 5 Drawing Sheets

(56) References Cited

U.S. PATENT DOCUMENTS

| | | | |
|---|---|---|---|
| 2005/0223066 A1* | 10/2005 | Buchheit et al. | 709/206 |
| 2005/0223067 A1* | 10/2005 | Buchheit et al. | 709/206 |
| 2005/0223326 A1* | 10/2005 | Chang et al. | 715/533 |
| 2005/0234850 A1* | 10/2005 | Buchheit et al. | 707/1 |
| 2005/0234910 A1* | 10/2005 | Buchheit et al. | 707/9 |
| 2005/0262203 A1* | 11/2005 | Buchheit et al. | 709/206 |
| 2006/0031358 A1* | 2/2006 | Canis | 709/206 |
| 2006/0075044 A1* | 4/2006 | Fox et al. | 709/206 |
| 2006/0277258 A1* | 12/2006 | Goldfarb | 709/206 |
| 2008/0082603 A1* | 4/2008 | Mansour et al. | 709/203 |
| 2009/0182824 A1* | 7/2009 | Haynes et al. | 709/206 |
| 2010/0057879 A1* | 3/2010 | Buchheit et al. | 709/206 |
| 2010/0064017 A1* | 3/2010 | Buchheit et al. | 709/206 |
| 2010/0080364 A1* | 4/2010 | Davis | 379/88.22 |
| 2010/0146059 A1* | 6/2010 | DellaFera et al. | 709/206 |
| 2010/0161734 A1* | 6/2010 | Wang | 709/206 |
| 2010/0235367 A1* | 9/2010 | Chitiveli et al. | 707/752 |
| 2010/0281397 A1* | 11/2010 | Buchheit et al. | 715/752 |
| 2010/0293242 A1* | 11/2010 | Buchheit et al. | 709/206 |
| 2010/0306185 A1* | 12/2010 | Smith et al. | 707/709 |
| 2011/0016188 A1* | 1/2011 | Buchheit et al. | 709/206 |
| 2011/0016189 A1* | 1/2011 | Buchheit et al. | 709/206 |
| 2011/0087744 A1* | 4/2011 | Deluca et al. | 709/206 |
| 2011/0119258 A1* | 5/2011 | Forutanpour et al. | 707/723 |
| 2011/0231499 A1* | 9/2011 | Stovicek et al. | 709/206 |

* cited by examiner

| Date/time | From | To | CC | BCC | Subject |
|---|---|---|---|---|---|
| 12:33 | Allan Maslowski | | ● | | Attendance |
| 11:42 | Darryl Orrell | | ● | | Re: Updated Safety Protocols |
| 10:14 | MCIE Inc. | ●● | | | Enroll today! |
| 9:08 | Marvin Winger | ●● | | | Re: Lunch |
| 8:57 | Jason Leftwich | ● | | | Fw: Accounts Payable |
| 8:48 | Paula Surratt | ● | | | New drawings |
| 8:41 | Sonia Koonce | ● | | ● | Accounts Payable |
| 8:32 | Amanda Olivas | ● | | | Updated Safety Protocols |
| 7:41 | Jeffery Priddy | | | ● | Organizational Meeting |
| 7:30 | Marvin Winger | | ● | | Lunch |

Fig. 3

| Date/time | From | To | Cc | BCC | Subject |
|---|---|---|---|---|---|
| 12:33 | Allan Maskowski | ● | | | Attendance |
| 10:14 | MCIE Inc. | ● | ● | | Re: Updated Safety Protocols |
| 9:08 | Marvin Winger | ● | | | Enroll today! |
| 8:57 | Jason Leftwich | ● | | | Re: Lunch |
| 8:48 | 📎 Paula Surratt | ● | | | Fw: Accounts Payable |
| 8:41 | 📎 Sonia Koonce | | | | New drawings |
| 8:32 | Amanda Olivas | ● | ● | ✱ | Accounts Payable |
| 7:41 | 📎 Jeffery Priddy | | ● | ✱ | Updated Safety Protocols |
| 7:30 | Marvin Winger | | ● | | Organizational Meeting |
| | | | | | Lunch |

This message was sent to 1 primary addressee

GRAPHICALLY INDICATING RELEVANCY OF ELECTRONIC MESSAGES

BACKGROUND

1. Field of the Invention

The present invention relates to electronic messaging systems and methods, and more specifically, to systems and methods for graphically determining relevancy of electronic messages and for displaying graphical indicia to a user based on the determined relevancy.

2. Description of Related Art

Electronic messaging systems, such as email messaging systems, text messaging systems, and the like, are common techniques used for communication. Such systems can be implemented by use of a desktop computer, laptop computer, or mobile device, such as a smartphone, in communication with a network, such as the Internet. The system may provide a user interface for allowing a user to view an electronic message, to compose an electronic message, and to send an electronic message to another user.

It is common for a user of an electronic messaging system to send and to receive many electronic messages, perhaps hundreds of such messages, each day. In some circumstances, these electronic messages are sent to all of, or a large group of, the users in a business organization. Such electronic messages may require immediate attention or action by a recipient, or may be sent only for informational purposes such that action is not required by the recipient. Therefore, some received electronic messages may have particular relevance to a select few of the message recipients, while others are not very relevant to the recipient. It may be difficult for a message recipient to quickly determine the relevancy of any particular electronic message. This is because a user interface may display many received electronic messages and only a portion of each message. As a result, it may not be readily apparent that any particular electronic message presented on by a user interface requires immediate attention.

Accordingly, for at least the aforementioned reasons, there is a need for improved techniques for indicating relevancy of electronic messages to users.

BRIEF SUMMARY

One or more embodiments of the present invention provide methods and systems for determining a relevancy of an electronic message and for graphically indicating the relevancy to a user. For example, a method may include receiving an electronic message, such as an email, at an electronic messaging system. The method may also include determining a relevance level of the electronic message to a user based on one or both of a number of primary addressees and a number of secondary addressees identified in the electronic message. For example, an electronic message may deemed to be less relevant than other electronic messages if the electronic message is addressed to many addressees and the user is not a primary recipient of the electronic message. In response to determining the relevance level, the method may include displaying graphical indicia based on the relevance level.

DETAILED DESCRIPTION

Exemplary methods and systems for determining a relevancy of an electronic message and for graphically indicating the relevancy to a user are described herein. Particularly, electronic messages may be received at an electronic messaging system. In an example, an electronic messaging manager may be configured for determining a relevance level of a received electronic message to a user based on a number of primary addressees or a number of secondary addressees identified in the electronic message. Additionally, the electronic messaging manager may be further configured to control a display to display graphical indicia based on the relevance level. The graphical indicia may be displayed on a display screen in association with the electronic message. By presenting the graphical indicia to the user, the user may be able to quickly determine whether he or she should soon view the associated electronic message, or whether the electronic message may be viewed at a later time.

As used herein, the term "electronic message" refers to any digital message that may be communicated between end users across a suitable network. An electronic message may include, but is not limited to, an email, a text message, an SMS message, and the like. The electronic messages may be communicated between across, for example, the Internet, a wireless network, a local area network (LAN), and the like.

An email may include a message header and a message body, which contains the email's content. The message header contains control information, including an originator's email address and one or more recipient addresses. The message header can be structured into fields including, but not limited to, a "From" field, a "To" field, a "Subject" field, a "Date" field, and a "Message ID" field. The "To" field may include one or more email addresses that identify one or more primary email addressees. When composing an email, the "To" field may be entered by a user for identifying a primary intended primary recipient of the email. An email may also include a carbon copy ("Cc") field and Blind carbon copy ("Bcc") field that may each include one or more email addresses that identify one or more secondary email addressees. The "Cc" field and/or "Bcc" field may be entered by a user for identifying secondary recipients of the email.

Figure 1:
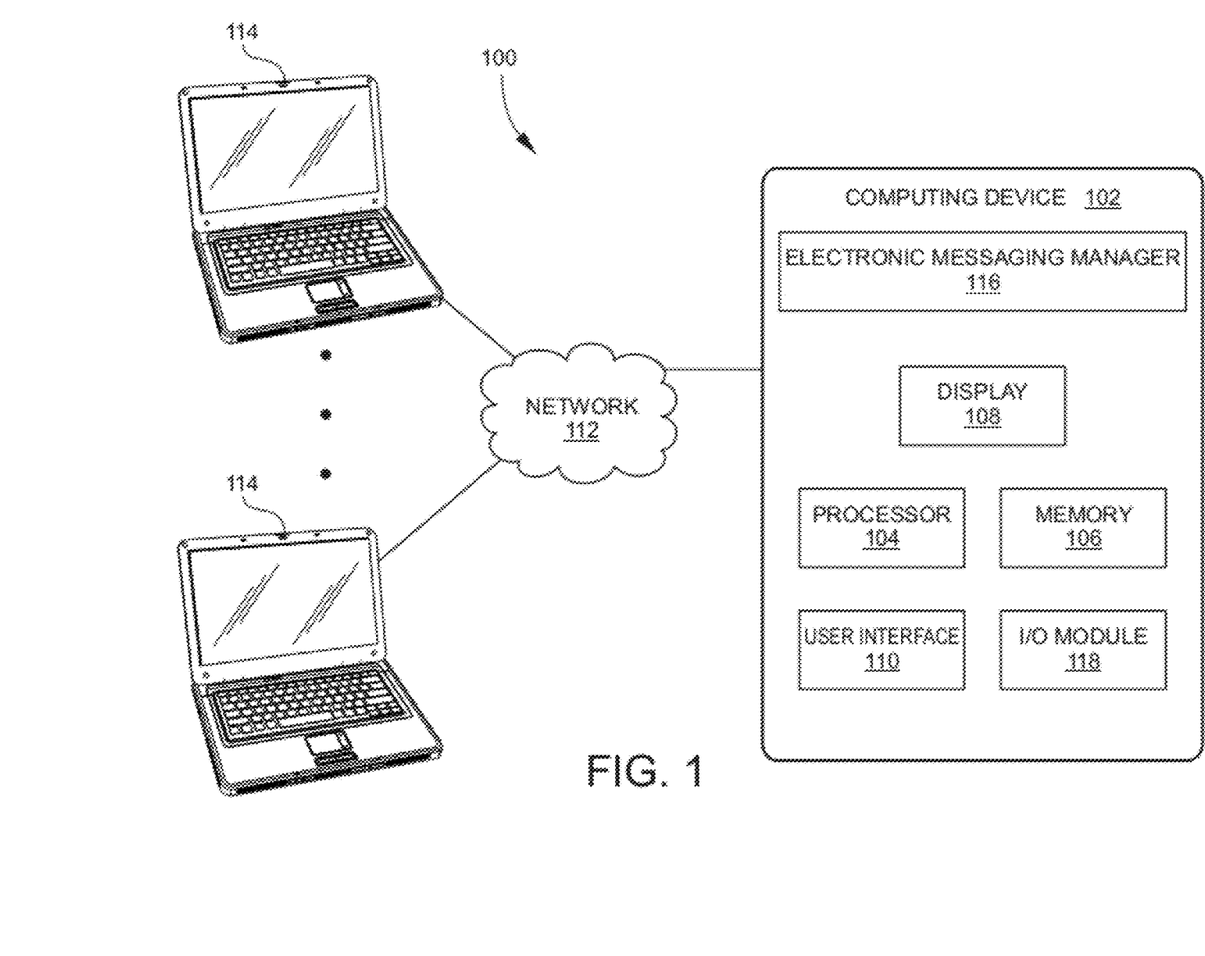
FIG. 1 sets forth a block diagram of an electronic messaging system for determining a relevancy of an electronic message and for graphically indicating the relevancy to a user in accordance with one or more embodiments of the present invention.

FIG. 1 illustrates a block diagram of an electronic messaging system 100 for determining a relevancy of an electronic message and for graphically indicating the relevancy to a user in accordance with one or more embodiments of the present invention. Referring to FIG. 1, the system 100 may include a computing device 102 having at least one processor 104 and memory 106. The computing device may be a desktop computer, a laptop computer, mobile device (e.g., a smartphone), or the like. The computing device 102 may be network accessible (e.g., Internet accessible) and may include a display 108 for rendering text and graphical information. The computing device 102 may include a user interface 110 with which a user may interact for operating the computing device 102. The user interface 110 may include, but is not limited to, a keyboard, a mouse, a trackpad, and/or the like.

The system 100 may include a network 112 configured for communication with the computing device 108 and other computing devices, such as computers 114. The network 112 may be any suitable type of communications network known to those of skill in the art. For example, the network 112 may be an intranet, extranet, or an internetwork, such as the Internet, or a combination thereof. The network 112 may include wireless, wired, and/or fiber optic links.

The computing device 102 may access and store data in memory 106. The memory 106 may be any suitable type of storage and may include a secondary storage element, e.g., hard disk drive, tape, or a storage subsystem that is internal or external to the computing device 102. Types of data that may be stored in the memory 106 include, for example, a database. It should be understood that the memory 106 is provided for purposes of simplification and ease of explanation and is not to be construed as limiting in scope. The memory 106 may be in the form of multiple memory devices utilized by the computing device 102.

The computing resources of the computing device 102 may include any suitable hardware, software, and/or firmware needed for receiving electronic messages, for sending electronic messages, for composing electronic messages, and for presenting electronic messages to a user. For example, the computing device 102 includes computing resources for applying these features to emails. Further, for example, the computing device 102 may include an electronic messaging manager 116 and an input/output module 118 for communicating emails to the network 112 for appropriate distribution to another computing device and for receiving emails from the network 112. A user may utilize the user interface 110 and the display 108 for composing email and for controlling the computing device 102 to communicate the email to the network 112. Further, the user may utilize the user interface 110 and the display 108 for selecting an email to be opened and for viewing the opened email on the display 108. As will be described in further detail herein below, the electronic messaging manager 116 may be configured to determine a relevancy of an email and to control the display 108 for graphically indicating the relevancy of the email to a user in accordance with one or more embodiments of the present invention.

Figure 2:
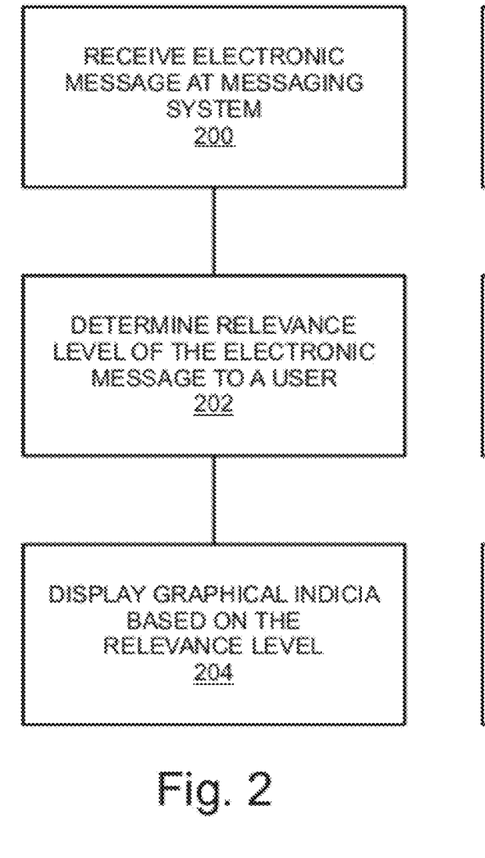
FIG. 2 sets forth a flowchart of an exemplary method for determining a relevancy of an electronic message and for graphically indicating the relevancy to a user according to one or more embodiments of the present invention.

FIG. 2 sets forth a flowchart illustrating an exemplary method for determining a relevancy of an electronic message and for graphically indicating the relevancy to a user according to one or more embodiments of the present invention. In this exemplary method, reference is made to the computing device 102 shown in FIG. 1 for purposes of illustration; however, reference to the computing device 102 should not be construed as limiting. Referring to FIG. 2, the method includes receiving 200 an electronic message at an electronic messaging system. For example, in the system 100 shown in FIG. 1, one of the computing devices 114 may generate and communicate an email to the computing device 102 via the network 112. In this example, the email may include an email address corresponding to the computing device 102 in its "To" field, "Cc" field, or "Bcc" field. The network 112 may use the email address for routing the email to the computing device 102. The I/O module 118 of the computing device 102 may receive the email, and the electronic messaging manager 116 may notify a user of receipt of the email via the display 108, or in any other suitable manner.

The method of FIG. 2 includes determining 202 a relevance level of the electronic message to a user based on one or both of a number of primary addressees and a number of secondary addressees identified in the electronic message. For example, the electronic messaging manager 116 shown in FIG. 1 may analyze an email received at the computing device 102 for determining the number of addressees in the "To" field of the email, the number of addressees in the "Cc" field of the email, and the number of addressees in the "Bcc" field in the email. The electronic messaging manager 116 may use these numbers for determining how relevant the email may be to the user. For example, an email may be labeled as being at a high level of relevance if there is a low number of addressees (e.g., 1 or 2 addressees) in the "To" field (i.e., a primary addressee field) and the user is one of the addressees in the "To" field.

In another example of determining relevancy of a received email, an email may be labeled as being at a medium level or low level of relevance if there is a high number of addressees (e.g., 5 or more addressees) in the "Cc" or "Bcc" fields (i.e., a secondary addressee field) and the user is one of the addressees in these fields.

In another example of determining relevancy of a received email, an email may be labeled as being at a medium level of relevance if there is a high number of addressees (e.g., 10 or more addressees in the "To" field and the user is one of the addressees in this field.

The aforementioned examples of determining relevancy of a received electronic message and any other examples disclosed herein should not be considered as being limiting. There are many other techniques for determining relevancy of determining the relevancy of an electronic message such as, but not limited to, determining whether the electronic message is labeled as urgent, determining whether the sender of the electronic message is a pre-identified sender (e.g., someone with authority over the recipient, or someone identified by the recipient as being associated with certain relevancy level), and determining whether the sender is identified in an organization's archive directory. In an example, an electronic message labeled as urgent may have a higher level of relevancy than others. In another example, electronic messages from a pre-identified sender may have a higher level of relevancy than others. In yet another example, electronic message sent from someone identified in an organization's archive directory may have a higher level of relevancy than others. These factors may be used alone or in combination with others described herein for determining a relevance level of an electronic message.

The method of FIG. 2 includes displaying 204 graphical indicia based on the determined relevance level. For example, different graphical indicia may be displayed to a user on a display screen for indicating the determined relevance level of an electronic message. For example, different indicia may be displayed depending on whether an email corresponds to either a high, medium, or low level of relevancy. The electronic messaging manager 116 may be configured to control the display 108 to display the graphical indicia.

Graphical indicia may be any suitable display object or graphically displayed feature that can be displayed on a computing device. For example, the graphical indicia can be a display icon (also referred to as a "computer icon" or simply an "icon"), which is typically a small graphic displayed on a computing device. The graphical indicia may be interacted with by placing a cursor on the display object, and "clicking" (or "double clicking") a mouse, trackball, or other button for selecting a file or information associated with a corresponding electronic message. For example, the graphical indicia may be interacted with, as described in more detail herein below, for presenting (e.g., displaying) to the user the numbers of primary and/or secondary addressees identified in the corresponding electronic message. Other information associated with the electronic message may be presented to the user by interaction with the graphical indicia.

Figure 3:
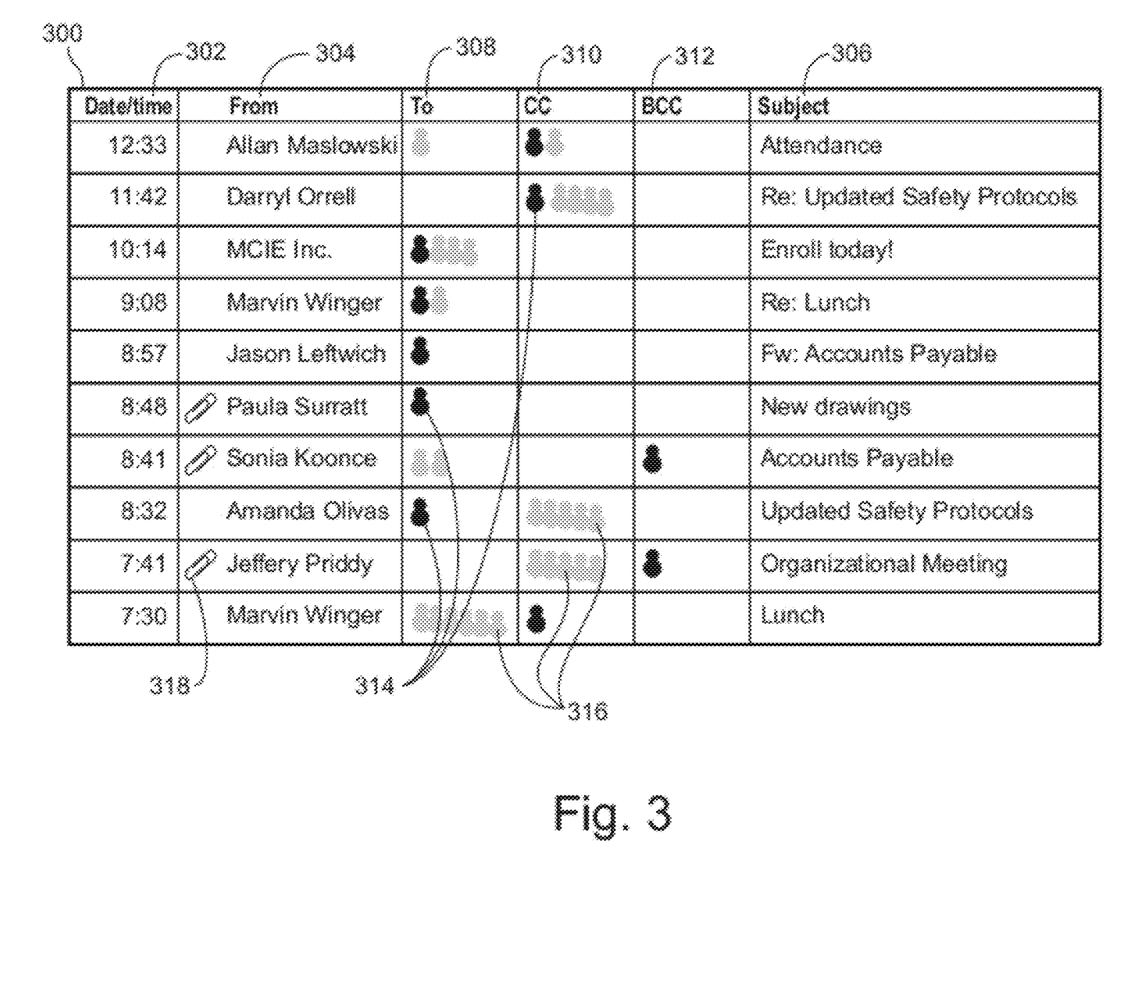
FIG. 3 sets forth an exemplary screen display for displaying graphical indicia for indicating relevance levels of emails in accordance with one or more embodiments of the present invention.

FIG. 3 illustrates an exemplary screen display 300 for displaying graphical indicia for indicating relevance levels of emails in accordance with one or more embodiments of the present invention. As will be appreciated, the screen display 300 displays an email inbox interface showing summary information about a plurality of received emails. Particularly, the screen display 300 shows header fields for "Date/time," "From," and "Subject," with the header fields being represented as 302, 304, and 306, respectively. Information relevant to each header field is then provided in a table form therebelow, with each line in the table representing a different email that has been received at a computing device. For example, beneath the "Date/time" header field 302, a date and/or time of receipt of the respective email is displayed. Further, for example, beneath the "From" header field 304, which may also be described as the "sender" header field, the names of senders or originators for each respective email are displayed. Beneath the "Subject" header field 306, the subject information associated with the respective email is displayed. A "paperclip" icon 318 may be displayed beneath the "From" header field 304 for indicating that the respective email includes an attachment, such as a word processing file, a text file, an image file, a video file, and the like.

According to one or more embodiments of the present invention, the screen display 300 may display additional header fields "To," "Cc," and "Bcc," with the header fields being represented as 308, 310, and 312, respectively. Graphical indicia may be provided for indicating a relevance level of each email to the user. For example, graphical indicia 314, represented as a darkly-shaded display icon, may be displayed on the screen display 300 underneath the "To" header field 308. In one or more embodiments, graphical indicia 314 may be provided between the "To" header field 308, the "Cc" header field 310, or the "Bcc" header field 312 for indicating that the user is the addressee in the respective "To" field, "Cc" field, or "Bcc" field of the respective email. When the user is a primary addressee of an email, such as in the email sent at 8:32 and having the subject of "Updated Safety Protocols," graphical indicia 314 is displayed beneath the "To" header field 308. Likewise, when the user is secondary "Cc" addressee of an email, such as the message sent at 12:33 and having the subject "Attendance," graphical indicia 314 is displayed beneath the "Cc" header field 310. Further, when the user is a secondary "Bcc" addressee of an email, such as the message sent at 8:41 and having the subject "Accounts Payable," graphical indicia 314 is displayed in the "Bcc" header field 312. Thereby, the user can view the screen display 300 and can then quickly assess whether he or she is a primary or secondary addressee in any particular one of the emails. If the user can see that he or she is a primary addressee, the user may determine that the email has a high level of relevance, and therefore, he or she should open the email to view its contents.

Graphical indicia 316, represented as a lightly-shaded icon, may be displayed on the screen display 300 for indicating a relative number of addressees in the respective "To" field, "Cc" field, or "Bcc" field of the respective email. For example, the graphical indicia 316 is displayed beneath the "To" header field 308 when an addressee, other than the user, is identified as a "To" addressee, such as the message sent at 7:30 and having the subject "Lunch" shown in FIG. 3. Further, graphical indicia 316 may be displayed beneath the "Cc" header field 310 or the "Bcc" header field 312 when an addressee is identified as a secondary "Cc" addressee or "Bcc" addressee, respectively.

Graphical indicia in accordance with embodiments of the present invention, such as the graphical indicia 314 and 316 shown in FIG. 3, may take on any appropriate form and are not limited to the one or more embodiments illustrated throughout the drawings. For example, other suitable graphical indicia could utilize a color-coded scheme to indicate the user and each addressee's status as primary or secondary addressees. In one or more embodiments, a bar graph could be utilized, while in other embodiments, the respective number of addressees for each respective header field could be displayed. Still in other embodiments, a fractional, exponential, or other mathematical number could be displayed for the respective number of addressees for each respective header field. A single graphical indicia may denote one user or addressee, or in one or more embodiments, may denote multiple addressees corresponding to a fractional number of the total number of addressees. These examples are provided for illustration purposes only and are not limiting to the methods, systems, and computer programmable code of the present invention. Additionally, these examples may be applied to each of the one or more embodiments of the present invention. Generally, the more other addressees that are indicated, then the less relevant a particular electronic message may be to the user, because it indicates that the electronic message was sent to more users. Note, however, that it could also indicate greater importance if more people are viewing an electronic message, especially if many people are in a "Cc" header field in the electronic message and the email user is the sole "To" recipient. So, by clearly showing the informative relevancy indicators in the greater context of the other standard information in an email inbox (e.g., date, from, subject), the user is presented with a better overall way to prioritize how quickly he opens particular email notes.

Figure 4:
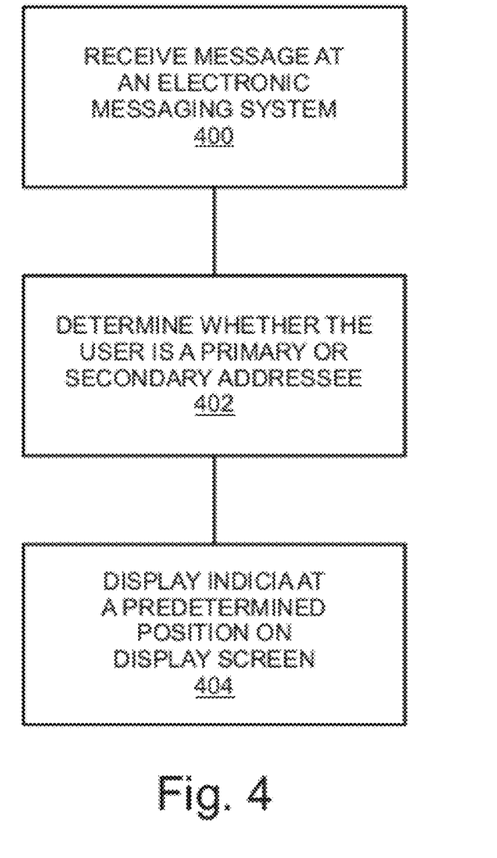
FIG. 4 sets forth a flowchart illustrating another exemplary method for determining a relevancy of an electronic message and for graphically indicating the relevancy to a user according to one or more embodiments of the present invention.

FIG. 4 sets forth a flowchart illustrating another exemplary method for determining a relevancy of an electronic message and for graphically indicating the relevancy to a user according to one or more embodiments of the present invention. In this exemplary method, reference is made to the computing device 102 shown in FIG. 1 for purposes of illustration; however, reference to the computing 102 should not be construed as limiting. Referring to FIG. 4, the method may include receiving 400 an electronic message at an electronic messaging system. The method includes determining 402 a relevance level based on whether the user is identified in the electronic message as a primary or secondary addressee. This may be accomplished by the electronic messaging manager 116.

The method of FIG. 4 includes displaying 404 graphical indicia at a predetermined position on a display screen based on whether the user is identified in the electronic message as a primary or secondary addressee 306. For example, referring again to FIG. 3 and as described in detail herein above, one or both of the graphic indicia 314 and 316 may be positioned beneath one of the "To" header field 308, the "Cc" header field 310, and the "Bcc" header field 312 for indicating the relevancy of a respective email in accordance with the embodiments of the present invention.

Figure 5:
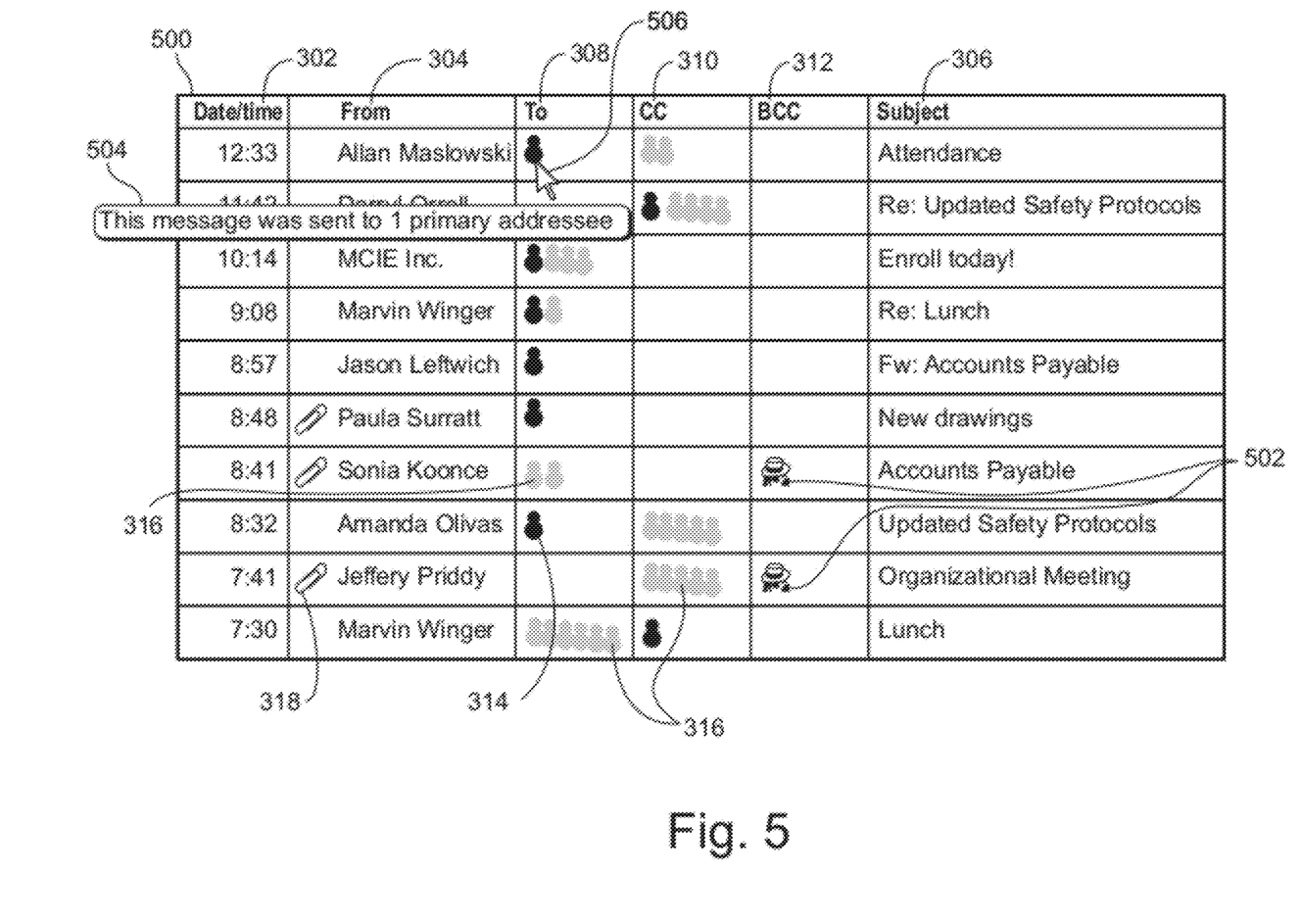
FIG. 5 sets forth another exemplary screen display for displaying graphical indicia for indicating relevance levels of emails in accordance with one or more embodiments of the present invention.

A screen display 500 according to one or more embodiments of the present invention is illustrated in FIG. 5. Similar to the screen display 300 illustrated in FIG. 3, screen display 500 includes header fields "Date/time," "From," "To," "Cc," "Bcc," and "Subject," represented by reference numbers 302, 304, 308, 310, 312, and 306, respectively. Similarly, graphical indicia 314, represented as a darkly-shaded icon, may be provided for indicating whether the user is associated with the "To," "Cc," or "Bcc" address in each respective email. In one of more embodiments of the present invention, when the user is associated with a secondary "Bcc" addressee of a message, such as the message sent at 8:41 and having the subject "Accounts Payable," a graphical indicia 502 may be displayed in the "Bcc" header field 510, which is different in appearance than graphical indicia 314. Graphical indicia 502 may be provided for alerting a user that they are a "Bcc" addressee of a message. This may increase the relevancy level of the message to the user, while also alerting the user to use caution when responding to a message in which they were a "Bcc" addressee.

A user may interact with graphical indicia 314 or 316 for displaying information about a respective email that is not shown on the display screen 500. For example, a user can interact with the graphical indicia 314 associated with the email corresponding to time 12:33. In response to the interaction, the electronic messaging manager 116 can control the display 108 to display a fly over text box 504 including text indicating the total number of primary addressees. The text box 504 may be displayed in response to a user input to control the positioning of a cursor 506 over the graphical indicia 314 associated with the email corresponding to time 12:33. Once the cursor 506 is positioned over the graphical indicia, a text box containing additional information about the respective email can be displayed. When the cursor 506 is moved from the graphical indicia, the text box may disappear.

Figure 6:
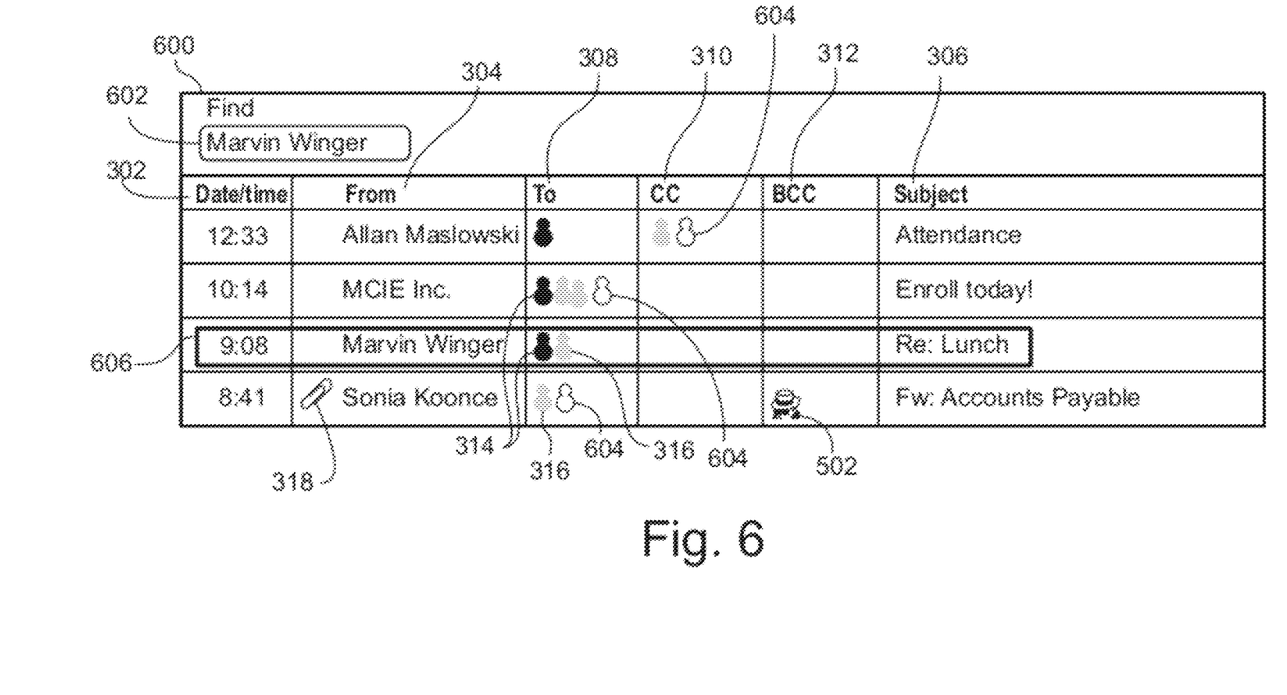
FIG. 6 sets forth another exemplary screen display for displaying graphical indicia for indicating relevance levels of emails in accordance with one or more embodiments of the present invention.

A screen display 600 according to one or more embodiments of the present invention is illustrated in FIG. 6. Similar to the screen display 300 illustrated in FIG. 3 and screen display 500 illustrated in FIG. 5, screen display 600 includes header fields "Date/time," "From," "To," "Cc," "Bcc," and "Subject," represented by reference numbers 302, 304, 308, 310, 312, and 306, respectively. Similarly, graphical indicia 314, represented as a darkly-shaded icon, may be provided for indicating whether the user is associated with the "To," "Cc," or "Bcc" address in each respective email.

The screen display 600 may be controlled by the electronic messaging manager 116 to display an addressee or sender search toolbar 602. The toolbar 602 may include a text box for receiving user input in the form of an addressee or sender name. This may be entered into the computing device 102 via the user interface 110 shown in FIG. 1. In response to receipt of the addressee or sender name, the electronic messaging manager 116 may determine whether each message identifies the user-selected sender or addressee. The screen display 600 may then change to display only those messages identifying the user-selected sender or addressee. The screen display 600 may also display graphical indicia 604 represented by an "empty" icon for displaying the user-selected sender or addressee's identification as a primary or secondary addressee. For example, graphical indicia 604 is provided beneath the "To" header field 308 for the email sent at 10:14 and having the subject "Enroll Today." In this manner, screen display 600 provides graphical indicia 604 to the user to indicate that the user-selected sender or addressee is a primary addressee of the respective email. Similarly, for the message sent at 12:33 and having the subject "Attendance," the user-selected sender or addressee was a secondary "Cc" addressee for the respective email. Screen display 600 may also display graphical indicia 606, which is represented as an outline box specifying the message sent at 9:08 and having the subject "Re: Lunch" for messages in which the user-selected sender is the sender of the respective message. In this manner, screen display 600 may display graphical indicia 606 to the user to indicate to him or her that the user-selected sender or addressee was the sender or originator of that message.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. In an example, all or a portion of the computer program product may reside on a host system, such as, but not limited to, the computing device 102 shown in FIG. 1. The computer program product may be embodied in all or a portion of the memory 106.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. For example, aspects of the present invention are described with reference to the block diagrams of FIG. 1 and the flowcharts of FIGS. 2 and 4. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving a plurality of electronic messages at an electronic messaging system of a user; and
   for each of the electronic messages:
   determining whether the user is either a primary addressee or a secondary addressee;
   determining a number of other users identified as a primary addressee and a number of other users identified as a secondary addressee;
   determining first graphical indicia based on the user being a primary addressee and the number of other users identified as a primary addressee;
   determining second graphical indicia based on the user being a secondary addressee and the number of other users identified as a secondary addressee;
   determining third graphical indicia based on the user being a primary addressee or a secondary addressee;
   defining first and second portions within a display space associated with each of the electronic messages;
   displaying a first indicator to indicate that the first portion is designated for display of relevancy information based on the primary addressee;
   displaying a second indicator to indicate that the second portion is designated for display of relevancy information based on the secondary addressee;
   displaying the first and second graphical indicia within the first and second portion, respectively; and
   displaying the third graphical indicia within one of the first and second portions in response to determining that the user is the primary addressee or the secondary addressee.

2. The method of claim 1, wherein displaying the third graphical indicia comprises displaying the third graphical indicia at a predetermined position on a display screen based on whether the user is identified in the electronic message as one of the primary addressee and the secondary addressee.

3. The method of claim 1, comprising:
receiving user input identifying one of a message sender and an addressee of the electronic messages;
determining whether each electronic message identifies the one of the message sender and the addressee; and
wherein displaying the first and second graphical indicia comprises displaying the first and second graphical indicia based on whether each electronic message identifies one of the message sender and the addressee.

4. The method according to claim 1, wherein determining a number of other users comprises determining a number of primary addressees and a number of carbon copy (Cc) secondary addressees of other users identified in the electronic message, and
wherein displaying the first graphical indicia comprises displaying the first graphical indicia in a respective primary header field of the electronic message; and
wherein displaying the second graphical indicia comprises displaying the second graphical indicia in a Cc secondary addressee header field of the electronic message.

5. The method according to claim 1, comprising:
receiving user input to interact with one of the first and second graphical indicia; and
in response to receiving the user input to interact with the one of the first and second graphical indicia, displaying one of the numbers of primary addressees and the numbers of secondary addressees.

6. The method according to claim 1, wherein determining a number of other users comprises determining whether the user is a blind carbon copy (Bcc) addressee, and
wherein determining the second graphical indicia comprises determining the second graphical indicia based on the determination that the user is Bcc addressee.

7. The method according to claim 6, wherein displaying the second graphical indicia comprises displaying the second graphical indicia at a predetermined position within the second portion based on the determination that the user is a Bcc addressee.

8. The method of claim 1, wherein the electronic messages are one of an email, a short message service (SMS) message, and a multimedia messaging service (MMS) message.

9. A system comprising:
a display;
an input/output (I/O) module configured to receive a plurality of electronic messages;
at least a processor and memory; and
an electronic messaging manager configured to, for each of the electronic messages:
determine whether the user is either a primary addressee or a secondary addressee;
determine a number of other users identified as a primary addressee and a number of other users identified as a secondary addressee;
determine first graphical indicia based on the user being a primary addressee and the number of other users identified as a primary addressee;
determine second graphical indicia based on the user being a secondary addressee and the number of other users identified as a secondary addressee;
determine third graphical indicia based on the user being a primary addressee or a secondary addressee;
define first and second portions within a display space associated with each of the electronic messages;
display a first indicator to indicate that the first portion is designated for display of relevancy information based on the primary addressee;
display a second indicator to indicate that the second portion is designated for display of relevancy information based on the secondary addressee;
control the display to display the first and second graphical indicia within the first and second portion, respectively; and
control the display to display third graphical indicia within one of the first and second portions in response to determining that the user is the primary addressee or the secondary addressee.

10. The system of claim 9, wherein the electronic messaging manager is configured to control, for each of the electronic messages, the display to display the third graphical indicia at a predetermined position on a display screen based on whether the user is identified in the electronic message as one of a primary addressee and a secondary addressee.

11. The system of claim 9, wherein the electronic messaging manager is configured to, for each of the electronic messages:
receive user input identifying one of a message sender and an addressee of the electronic messages;
determine whether each electronic message identifies the one of the message sender and the addressee; and
control the display to display the first and second graphical indicia based on whether each electronic message identifies the one of the message sender and the addressee.

12. The system of claim 9, wherein the I/O module is configured to receive user input to interact with one of the first and second graphical indicia, and
wherein the electronic messaging manager is configured to display, for each of the electronic messages, one of the numbers of primary addressees and the numbers of secondary addressees in response to receiving user input interacting with the one of the first and second graphical indicia.

13. The system of claim 9, wherein the electronic messaging manager is configured to, for each of the electronic messages:
determine whether the user is a blind carbon copy (Bcc) addressee; and
control the display to display the second graphical indicia based on whether the user is a Bcc addressee.

14. The system of claim 13, wherein the electronic messaging manager is configured to control, for each of the electronic messages, the display to display the second graphical indicia at a predetermined position within the second portion based on whether the user is identified in the electronic message as a Bcc addressee.

15. The system of claim 9, wherein the electronic messages are one of an email, a short message service (SMS) message, and a multimedia messaging service (MMS) message.

16. A computer program product for displaying graphical indicia associated with an electronic message, said computer program product comprising:
a non-transitory, computer readable storage medium having computer readable program code embodied therewith, the computer readable program code comprising:
computer readable program code configured to receive a plurality of electronic messages at an electronic messaging system of a user;
computer readable program code configured to determine, for each of the electronic messages, whether the user is either a primary addressee or a secondary addressee;

computer readable program code configured to determine, for each of the electronic messages, a number of other users identified as a primary addressee and a number of other users identified as a secondary addressee;

computer readable program code configured to determine, for each of the electronic messages, first graphical indicia based on the user being a primary addressee and the number of other users identified as a primary addressee;

computer readable program code configured to determine, for each of the electronic messages, second graphical indicia based on the user being a secondary addressee and the number of other users identified as a secondary addressee;

computer readable program code configured to determine third graphical indicia based on the user being a primary addressee or a secondary addressee;

computer readable program code configured to define first and second portions within a display space of a display associated with each of the electronic messages;

computer readable program code configured to control the display to display a first indicator to indicate that the first portion is designated for display of relevancy information based on the primary addressee;

computer readable program code configured to control the display to display a second indicator to indicate that the second portion is designated for display of relevancy information based on the secondary addressee;

computer readable program code configured to control the display to display, for each of the electronic messages, the first and second graphical indicia within the first and second portion, respectively; and computer readable program code configured to control the display to display third graphical indicia within one of the first and second portions in response to determining that the user is the primary addressee or the secondary addressee.

17. The computer program product of claim 16, comprising computer readable program code configured to control a display to display, for each of the electronic messages, the third graphical indicia at a predetermined position thereon based on whether the user is identified in the electronic message as one of the primary addressee and the secondary addressee.

* * * * *